Patented May 27, 1930

1,760,513

UNITED STATES PATENT OFFICE

REGINALD HILL MONK AND LUDVIG FIRING, OF MONTREAL, QUEBEC, CANADA; SAID FIRING ASSIGNOR TO JOHN IRWIN, OF MONTREAL, CANADA

PRODUCTION OF ALKALINE-EARTH TITANATES

No Drawing. Application filed February 10, 1927. Serial No. 167,354.

This invention relates to pure alkali-earth metal titanates suitable for use as pigments as well as for other technical purposes, and to a process of producing such titanates.

In the production of pigments, it has heretofore been proposed to incorporate titanates in composite titanium pigments. By the methods previously suggested, an alkali-earth metal carbonate is added to a titanium hydrate containing $SO_4$, whereby an insoluble sulphate and a titanate of the alkaline earth are formed, and these with the titanium oxide form the composite pigment. Such a composite pigment may have, inherently, different indices of refraction which influence the opacity of the pigment.

The object of this invention is to produce pure alkali-earth metal titanates, which are well adapted for various technical uses, and which are excellent paint pigments. These titanates are substantially free from all foreign matter and are not composite products.

The hydrates of titanium, the raw material to which the process of this invention is applied, produced by the now well known methods, usually contain $SO_4$. We have found the presence of this $SO_4$, in the form in which it exists in the titanium hydrate, detrimental to the formation of titanates, and therefore an essential step in the complete process of this invention is the removal of the $SO_4$. It will be apparent that if $SO_4$ is not removed from the raw material, the final product will contain undesired compounds.

For use as a pigment, the product should be free from grit or hard particles and have a soft texture.

In accordance with this invention, an aqueous paste of freshly precipitated titanium hydrate, substantially free from impurity, is treated to remove all the $SO_4$ without leaving any insoluble salt of this acid radical. To this so treated titanium hydrate, a sufficient quantity of an aqueous paste of carbonates of the alkali-earth metals is added, so that the final product obtained contains a predetermined quantity of $TiO_2$. It has heretofore been recognized that the tinctorial capacity of a titanium pigment has a definite relation to the $TiO_2$ content of the pigment.

In order to hasten the completion of the reaction and facilitate the production of a final product of pure white colour, soft in texture and free from grit or hard particles, there is added to the mixture of the titanium hydrate and carbonate, a substance which acts as an accelerator for the reaction. For this purpose, hydrochloric acid or the equivalent salt, such as barium chloride, may be used. It is thus possible to greatly reduce the time required for the completion of the reaction, approximately one-half an hour, after the mixture reaches the required temperature, being sufficient for the formation of the titanates. Furthermore, the temperature employed may be from 200° to 300° C. lower than that necessary in the operation of the direct process or if the $SO_4$ is not completely removed from the hydrate. The high temperature ordinarily required is detrimental in securing the character of product desired in that it tends to produce a hard, unsatisfactory pigment.

To illustrate a specific embodiment of the invention and describe a particular application thereof, the following example is given.

To an aqueous paste of freshly precipitated titanic acid a sufficient quantity of a normal acetate, such as zinc acetate, sodium acetate or ammonium acetate, is added to react with the $SO_4$ present. The sulphate thus formed is entirely eliminated by washing with water. To the paste thus prepared is added a sufficient quantity of barium carbonate in paste form to produce a compound having the formula $BaTiO_3$. For this reaction, titanic acid, equivalent to 100 parts $TiO_2$, requires approximately 248 parts of dry barium carbonate. Approximately 3 parts of hydrochloric acid are added to this mixture which is then fed into a furnace, the temperature of which is raised to approximately 750° to 880° C., depending upon the properties desired in the final product. For the production of the titanate for use as a pigment, a temperature of 830° C. gives good results.

When the reaction is complete, the product is of a pure white colour, free from sulphates or other impurities, and in a fine state of division. It has a faint alkaline reaction.

In neutralizing the SO$_4$ in the titanic acid, it is found that when alkaline or basic materials are used, a portion of such material is absorbed by the titanic acid, forming compounds with it. By the use of a salt, such as sodium acetate, the solution is maintained slightly acidic and this absorption and release of SO$_4$ does not occur. Hence the precipitate may be entirely purified by washing. It is of course essential that only soluble salts be formed so that they may be entirely removed by washing.

It will be apparent that the product is formed at a temperature lower than that at which the titanates of the alkali-earth metals are usually formed. When the product is to be used for other than pigmentary purposes, the higher temperatures may give satisfactory results, but in order to secure in the product the best covering capacity, temperature control is essential.

While a detailed description has been given for a clear understanding of the invention, it is to be understood that the following claims are to be interpreted as broadly as permissible in view of the prior art.

What we claim is:

1. In a process of producing alkali-earth metal titanates from pure titanium hydrates and alkaline earth carbonates, the step which consists in treating the mixture, at a temperature substantially lower than that at which such titanates are usually formed, in the presence of a small quantity of chloride of an alkali-earth metal.

2. A process of producing alkali-earth metal titanate from precipitated titanium hydrate containing SO$_4$, which comprises eliminating the SO$_4$ from the hydrate by treatment with normal acetate of alkali metal or ammonium and washing with water, adding to the purified hydrate an alkali-earth metal carbonate and a small quantity of hydrochloric acid to form an accelerator and heating the mixture to a temperature between 750° and 880° C.

3. The process of treating precipitated titanium hydrate which comprises completely eliminating undesired acid substance from the hydrate by treatment with sodium acetate and washing with water, adding to the hydrate the carbonate of an alkali-earth metal and heating the mixture to form an alkali-earth metal titanate.

4. In the production of alkali-earth metal titanates, the process which comprises treating precipitated titanium hydrate with a normal acetate of an alkali metal or ammonium and washing with water to remove the SO$_4$, adding to the purified hydrate barium carbonate and sufficient HCl to form an accelerator and heating the mixture to a temperature between 750° and 880° C., substantially as herein described.

5. A process of producing a titanate of barium from precipitated titanium hydrate which comprises treating the hydrate with sodium acetate to unite with all the SO$_4$ in the said hydrate, washing with water to remove the sodium sulphate formed, adding to the hydrate barium carbonate and adding a sufficient amount of HCl to form an accelerator and heating the mixture to approximately 830° C., as herein described.

6. The process of treating precipitated titanium hydrates containing undesired acid substance, whereby such undesired acid substance is removed, which comprises treating the titanium hydrate with a normal acetate of an alkali metal or ammonium which, on reacting, forms a water-soluble salt which is entirely eliminated by washing with water, and washing the mixture.

7. In a process of treating precipitated titanium hydrates containing an undesired acid radical, the step which consists in entirely eliminating the undesired acid radical by treating the hydrate with a normal acetate of an alkali metal or ammonium and washing with water.

8. The process of treating precipitated titanium hydrate containing SO$_4$, which comprises treating said hydrate with sufficient sodium acetate to combine with all the SO$_4$ to form soluble sodium sulphate and washing the mixture to entirely eliminate the sodium sulphate.

9. In the production of alkali earth metal titanates, the process which comprises eliminating any SO$_4$ that may exist therein from precipitated titanium hydrate, by treatment with a normal acetate of an alkali metal or ammonium and washing with water, adding to the hydrate an alkaline earth carbonate and a sufficient amount of HCl to form an accelerator and heating the mixture.

In testimony whereof we have affixed our signatures.

REGINALD HILL MONK.
LUDVIG FIRING.